United States Patent
Rahmanian et al.

(10) Patent No.: US 10,599,503 B2
(45) Date of Patent: Mar. 24, 2020

(54) TRIGGERING POWER LOSS PROTECTION ON SOLID-STATE STORAGE DEVICES

(71) Applicant: Dell Products L.P., Round Rock, TX (US)

(72) Inventors: Amir Rahmanian, Round Rock, TX (US); John E. Jenne, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 15/222,756

(22) Filed: Jul. 28, 2016

(65) Prior Publication Data

US 2018/0032390 A1    Feb. 1, 2018

(51) Int. Cl.
*G06F 11/07* (2006.01)
*G06F 1/30* (2006.01)
*G06F 12/121* (2016.01)
*G06F 11/10* (2006.01)

(52) U.S. Cl.
CPC .......... *G06F 11/0754* (2013.01); *G06F 1/30* (2013.01); *G06F 11/0793* (2013.01); *G06F 11/1076* (2013.01); *G06F 12/121* (2013.01)

(58) Field of Classification Search
CPC .......... G06F 11/0754; G06F 11/0727; G06F 11/0772; G06F 11/079; G06F 11/0793; G06F 11/121; G06F 1/3287; G06F 1/30
USPC .................................................. 714/14, 22
See application file for complete search history.

(56) References Cited

U.S. PATENT DOCUMENTS

| | | | | | |
|---|---|---|---|---|---|
| 5,396,637 | A | * | 3/1995 | Harwell | G06F 11/1441 365/228 |
| 2010/0202240 | A1 | * | 8/2010 | Moshayedi | G11C 5/04 365/229 |
| 2014/0001871 | A1 | * | 1/2014 | Vogman | H02M 1/32 307/82 |
| 2014/0258755 | A1 | * | 9/2014 | Stenfort | G06F 1/30 713/323 |
| 2015/0029808 | A1 | * | 1/2015 | Allison | G11C 5/005 365/227 |
| 2015/0153802 | A1 | * | 6/2015 | Lucas | G06F 1/30 714/22 |
| 2016/0041602 | A1 | * | 2/2016 | Yuasa | G06F 11/2015 713/323 |

(Continued)

*Primary Examiner* — Joseph R Kudirka
(74) *Attorney, Agent, or Firm* — Baker Botts L.L.P.

(57) ABSTRACT

An information handling system may implement techniques for triggering power loss protection on solid-state storage devices (SSDs) based on PSU pre-warning signals (such as de-asserted POK or VIN_GOOD signals) indicating that power loss is imminent. The pre-warning signals may be provided directly to SSDs over a dedicated connection or may be passed through other components of the information handling system (such as power loss warning logic, a platform controller hub, or a CPU) to a storage controller. The pre-warning signal may be provided to the storage controller as a power loss warning interrupt. This interrupt may cause the storage system controller to issue an in-band message/command to the SSDs or to provide a signal on a dedicated connection to the SSDs in order to trigger power loss protection actions on the SSDs, including switching their power sources and flushing write queues before available hold-up energy is depleted.

16 Claims, 8 Drawing Sheets

(56) References Cited

U.S. PATENT DOCUMENTS

2016/0118130 A1* 4/2016 Chadha ................ G11C 16/225
　　　　　　　　　　　　　　　　　　　　　711/103
2016/0283336 A1* 9/2016 Petersen ............. G06F 11/2015
2017/0091042 A1* 3/2017 Chou .................. G06F 11/1415

* cited by examiner

TRIGGERING POWER LOSS PROTECTION ON SOLID-STATE STORAGE DEVICES

BACKGROUND

Field of the Disclosure

This disclosure relates generally to information handling systems and, more particularly, to triggering power loss protection on solid-state storage devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some information handling systems, solid-state storage devices (SSDs) include internal power loss protection (PLP) circuits to protect data before power is lost. These circuits, which typically rely on bulk capacitors, can degrade over the time. In addition, if there is bulk capacitor damage, they might not protect any data when a power loss event occurs. In some SSDs, an input voltage monitor in the PLP circuit can detect input voltage variances, such as in the event of a loss of AC power or an AC brownout for the system's power supply, after the fact.

SUMMARY

In one aspect, a disclosed method is for triggering power loss protection on solid-state storage devices in an information handling system. The method may include receiving, from a power supply unit, a pre-warning signal indicating that a power loss event is imminent, providing, to one or more solid-state storage devices in response to receiving the pre-warning signal, a power loss warning indicating that the solid-state storage devices should begin taking action to prevent data loss in the information handling system due to the power loss event, and initiating, by a respective power loss protection circuit on each of the one or more solid-state devices in response to receiving the power loss warning, performance of one or more actions to prevent data loss in the information handling system. The initiating may be performed prior to the power loss event being detectable by the power loss protection circuit.

In any of the disclosed embodiments, the one or more actions to prevent data loss may include switching a power source for at least one of the solid-state storage devices from the power supply unit to hold-up energy stored in the respective power loss protection circuit of the solid-state storage device. The method may also include performing the one or more actions to prevent data loss prior to depletion of the hold-up energy.

In any of the disclosed embodiments, the one or more actions to prevent data loss may include flushing one or more write queues to persistent memory on the one or more solid-state storage devices.

In any of the disclosed embodiments, the pre-warning signal may include a signal that, when de-asserted, indicates that a predetermined minimum hold-up time following a loss of AC input voltage has expired, or a signal that, when de-asserted, indicates that an AC input voltage level does not meet a predetermined minimum voltage level.

In any of the disclosed embodiments, providing the power loss warning to the one or more solid-state storage devices may include providing a power loss warning interrupt to a storage controller for the one or more solid-state storage devices.

In any of the disclosed embodiments, providing the power loss warning to the one or more solid-state storage devices may include asserting a power loss warning signal that is directly connected to a storage controller for the one or more solid-state storage devices.

In any of the disclosed embodiments, providing the power loss warning to the one or more solid-state storage devices may include asserting a power loss warning signal that is directly connected to the one or more solid-state storage devices.

In any of the disclosed embodiments, the method may also include providing, to at least one component in the information handling system other than one of the solid-state storage devices, a power loss warning indicating that the component should allocate, to the one or more solid-state storage devices, at least a portion of available hold-up energy that would otherwise be used to power the component in response to the power loss event.

Another disclosed aspect includes an information handling system including a power supply unit, at least one solid-state storage device, and a power loss warning circuit. The power loss warning circuit may be operable to receive, from the power supply unit, a pre-warning signal to indicate that a power loss event is imminent, and to provide, to the solid-state storage device in response to receipt of the pre-warning signal, a power loss warning to indicate that the solid-state storage devices should take action to prevent data loss in the information handling system due to the power loss event. The solid-state storage device may include a power loss protection circuit to initiate, responsive to receipt of the power loss warning, performance of one or more actions to prevent data loss in the information handling system prior to detection of the power loss event by the power loss protection circuit.

In any of the disclosed embodiments, the one or more actions to prevent data loss may include an action to switch a power source for at least one of the solid-state storage devices from the power supply unit to hold-up energy stored in the respective power loss protection circuit of the solid-state storage device. The one or more actions to prevent data loss may be performed prior to depletion of the hold-up energy.

In any of the disclosed embodiments, the one or more actions to prevent data loss may include an action to flush one or more write queues to persistent memory on the one or more solid-state storage devices.

In any of the disclosed embodiments, the information handling system may also include a storage controller for the one or more solid-state storage devices. To provide the power loss warning to the one or more solid-state storage devices, the power loss warning circuit may be operable to provide a power loss warning interrupt to the storage controller.

In any of the disclosed embodiments, the storage controller may include circuitry to issue, to at least one of the solid-state storage devices in response to receipt of the power loss warning, an-band command to trigger one or more actions, by the solid-state storage device, to prevent data loss in the information handling system due to the power loss event.

In any of the disclosed embodiments, to provide the power loss warning to the one or more solid-state storage devices, the power loss warning circuit may be operable to assert a power loss warning signal that is directly connected to a storage controller for the one or more solid-state storage devices, or to assert a power loss warning signal that is directly connected to the one or more solid-state storage devices.

In any of the disclosed embodiments, the power loss warning circuit may also be operable to provide, to at least one component in the information handling system other than one of the solid-state storage devices, a power loss warning to indicate that the component should allocate, to the one or more solid-state storage devices, at least a portion of available hold-up energy that would otherwise be used to power the component in response to the power loss event.

In any of the disclosed embodiments, the power supply unit may include circuitry to: monitor AC input voltage, detect a loss of AC input voltage, and output, responsive to detection of the loss of AC input voltage, the pre-warning signal to indicate that a power loss event is imminent.

In any of the disclosed embodiments, the power supply unit may include circuitry to monitor a charge on a bulk capacitor of the power supply unit, detect that the charge on the bulk capacitor has dropped below a predetermined threshold value, and output, responsive to detection of the drop in the charge on the bulk capacitor, the pre-warning signal to indicate that a power loss event is imminent.

A further disclosed aspect includes a system including a storage controller and at least one storage device coupled to the storage controller. The system may also include circuitry to receive, from a power supply unit, a pre-warning signal to indicate that a power loss event is imminent, and to provide, to the storage device responsive to receipt of the pre-warning signal, a power loss warning to indicate that the storage device should take action to prevent data loss in the system due to the power loss event. The storage device may include a power loss protection circuit to initiate, responsive to receipt of the power loss warning, performance of one or more actions to prevent data loss in the system prior to detection of the power loss event by the power loss protection circuit.

In any of the disclosed embodiments, the one or more actions may include an action to switch a power source for the storage device from the power supply unit to hold-up energy stored in the power loss protection circuit of the storage device, or an action to flush one or more write queues to persistent memory on the storage device prior to depletion of the hold-up energy.

In any of the disclosed embodiments, the system may also include a storage controller for the storage device. To provide the power loss warning to the storage device, the system may also include circuitry to provide a power loss warning interrupt to the storage controller, to assert a power loss warning signal that is directly connected to the storage controller, or to assert a power loss warning signal that is directly connected to the storage device.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (or other SSD); as well as communications media such wires, optical fibers, microwaves, radio waves, and other electromagnetic and/or optical carriers; and/or any combination of the foregoing.

As will be described in further detail, the inventors of the present disclosure have developed methods and systems disclosed herein for triggering power loss protection (PLP) for solid-state storage devices (SSDs) and for providing additional hold-up time to allow those devices to complete actions to protect data from loss. In at least some embodiments of the present disclosure, these systems may take advantage of one or more pre-warning signals that a power supply unit (PSU) provides to the system to enable the SSDs to begin taking action to protect data before the SSDs themselves would have been able to detect an imminent power loss event. For example, in some embodiments, a pre-warning signal may be routed directly from a PSU to an SSD to trigger power loss protection. In other embodiments, logic in the information handling system may receive a pre-warning signal from a PSU and may provide an interrupt signal to a storage controller and/or initiate the execution of a storage controller command to trigger power loss protection on one or more SSDs. In various embodiments, these signals may provide a minimum of 5 ms and up to 25 ms pre-warning that a power loss event is (or is potentially) imminent. By providing information to the SSDs indicating that a power loss event is (or is potentially) imminent, the SSDs may be able to complete its hold-up actions well before the hold-up energy is depleted. In some embodiments, the use of these techniques for triggering power loss protection on SSDs may allow the size and/or costs of the PLP circuits within the SSDs to be reduced, since they may not need to provide power for as long following a power loss event as in existing systems.

In some embodiments, the method may include receiving, from a power supply unit (PSU) a pre-warning signal indicating that a power loss event is imminent, providing, to one or more solid-state storage devices (SSDs), an indication that the SSD(s) should begin power loss protection actions, and initiating, by a power loss protection (PLP) circuit on each of the SSD(s), the performance of hold-up actions to protect any as-yet-unwritten data in the system, which may include flushing, to the SSD (s) prior to the SSD(s) detecting an input voltage change that would trigger PLP actions, any as-yet-unwritten data.

Particular embodiments are best understood by reference to FIGS. 1-8, in which like numbers are used to indicate like and corresponding parts.

Figure 1:
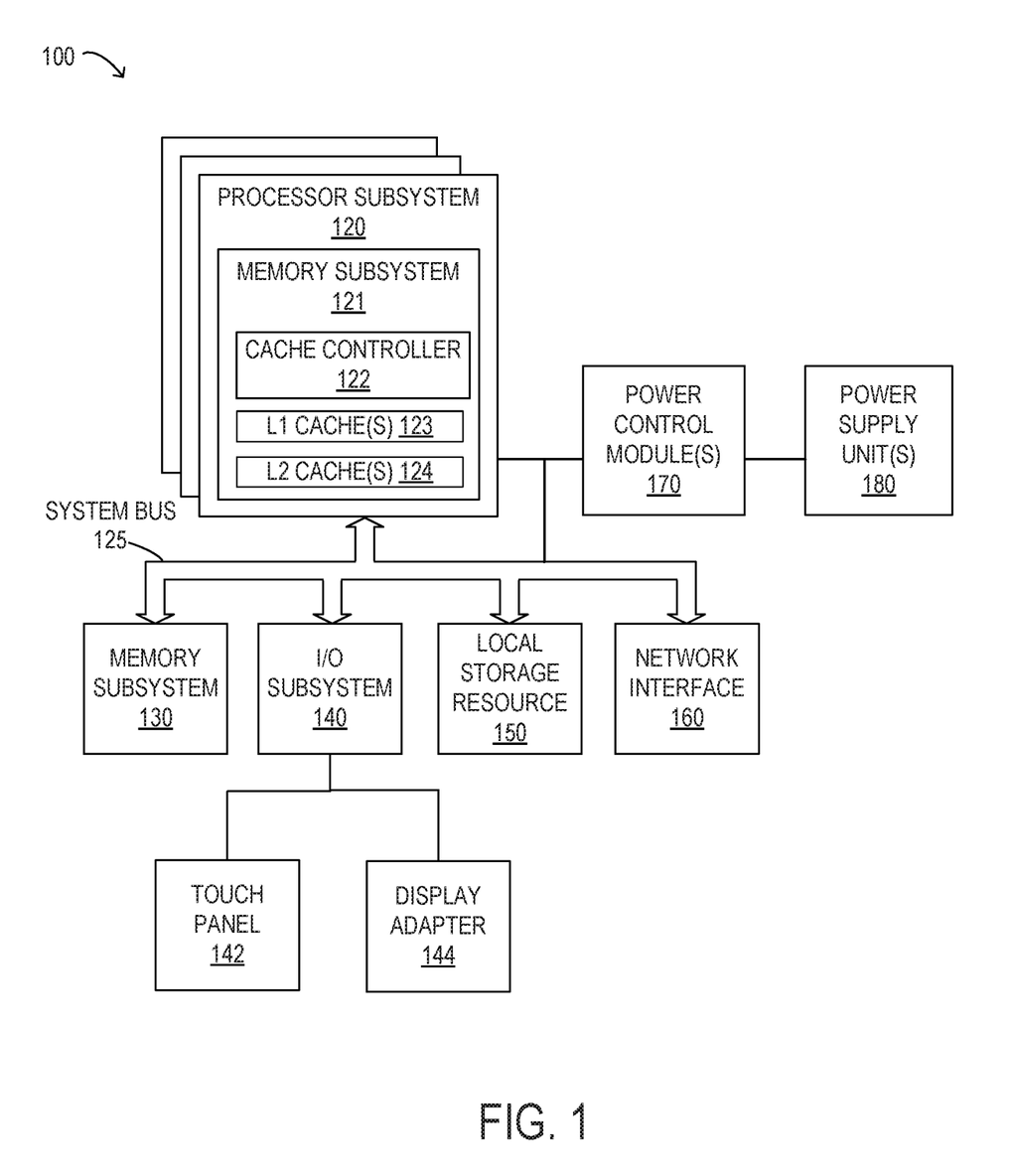
FIG. 1 is a block diagram of selected elements of an embodiment of an information handling system.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 may include, but are not limited to, processor subsystem 120, which may comprise one or more processors, and system bus 125 that communicatively couples various system components to processor subsystem 120 including, for example, a memory subsystem 130, an I/O subsystem 140, local storage resource 150, and a network interface 160. System bus 125 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network (not shown). Network interface 160 may enable information handling system 100 to communicate over the network using a suitable transmission protocol and/or standard, including, but not limited to, transmission protocols and/or standards enumerated below with respect to the discussion of network 155. In some embodiments, network interface 160 may be communicatively coupled via the network to a network storage resource (not shown). The network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). The network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. The network coupled to network interface 160 and/or various components associated therewith may be implemented using hardware, software, or any combination thereof.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

As illustrated in FIG. 1, a memory subsystem 121 within processor subsystem 120 may include multiple data caches, such as one or more level 1 (L1) caches 123 and/or level 2 (L2) caches 124. For example, a level 1 cache 123 may be local to a particular processor or processor core within processor subsystem 120, and a level 2 cache 124 may be shared between multiple processors or processor cores within a processor subsystem 120. In some embodiments of the present disclosure, one or more of these caches may be implemented as write-back caches. In such embodiments, the modified contents of the write-back caches may be written out to persistent memory (e.g., a non-volatile memory within memory subsystem 130 or local storage resource 150) in response to a power loss event. A cache controller 122 within memory subsystem 121 may include circuitry to manage the contents of one or more L1 caches 123 and/or L2 caches 124. For example, cache controller 122 may include circuitry to determine when and if an individual cache line or a group of cache lines should be flushed to persistent memory (such as a solid-state storage device) or otherwise evicted from one of the caches in accordance with a predetermined cache line replacement policy.

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. In some embodiments, memory subsystem 130 may include a level 3 (L3) cache or a last-level cache (not shown), which may be shared between processors or processor cores in multiple processor subsystems 120. Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. In at least some embodiments, local storage resource 150 may include a collection of SSDs and a storage controller, such as a RAID controller or another suitable storage controller (not shown). In system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. As shown, I/O subsystem 140 may comprise touch panel 142 and display adapter 144. Touch panel 142 may include circuitry for enabling touch functionality in conjunction with a display device that is driven by display adapter 144. It is noted that when information handling system 100 is a laptop computer with an integrated display device, display adapter 144 may provide connectivity for an external display.

As illustrated in FIG. 1, system 100 may include one or more power control modules 170 and one or more power supply units (PSUs) 180. In at least some embodiments, power control modules 170 may include power distribution circuitry. In at least some embodiments, power control module(s) 170 may control the allocation of power generated by one or more of the power supply units (PSUs) 180 to other resources in system 100. In some embodiments, one or more of the power control modules 170 may include a management controller (MC).

As referred to herein, system "hold-up" may be defined in terms of energy (e.g., power×time). For example, the "hold-up energy" in an information handling system (such as system 100 illustrated in FIG. 1) may represent the amount of energy available to perform hold-up actions (including, but not limited to, those involved in protecting the system from data loss) following a power fault or other power-loss event in the system. In some embodiments, the cache controllers in information handling system 100 may include mechanisms to support an Asynchronous DRAM Refresh (ADR) feature, which includes flushing at least some write-protected data buffers and/or modified cache lines to persistent memory periodically (e.g., based on an ADR timer) and/or in response to the detection of particular conditions that trigger a cache flush.

In some embodiments, an SSD that includes a power loss protection (PLP) circuit may, according to a power loss protection specification for the SSD, be required to maintain the integrity of all data in write-back caches in the system (if used) and in the flash memory in the event of a power loss or if the supplied power is outside of specification for any period of time. In a system that includes one or more write-back caches, the time to flush the write-back caches to the persistent memory and the power consumption of the system during the cache flushing affect the amount of hold-up energy that may need to be available in order to avoid data loss following a power fault or other power-loss event. For example, in some existing systems, the time to complete the cache flushing may be on the order of 3 ms-50 ms, depending on the memory configuration in the system, the performance of the persistent memory target, and/or other factors.

A typical SSD may include a PLP circuit having the following features:
  An input voltage monitor circuit to detect input voltages and power loss events, including normal power off events, hot plug events, and any other unexpected power loss events
  A boost converter to increase input voltage (e.g., from 12V up to 30V)
  A down converter to reduce voltage (e.g., from 30V down to 12V)
  One or more hold-up time capacitors between the boost converter and the down converter to store the energy to be provided in the case of a power loss event.

Figure 2:
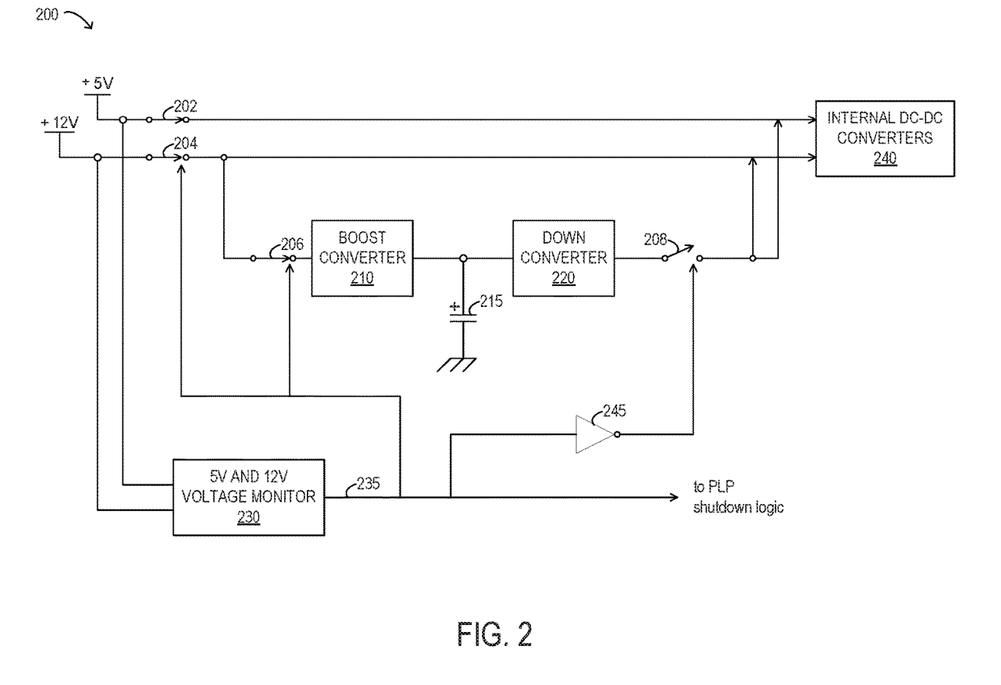
FIG. 2 a block diagram of selected elements of an embodiment of a power loss protection circuit in a solid-state storage device.

FIG. 2 is a block diagram of selected elements of a power loss protection circuit 200 in a solid-state storage device, according to at least some embodiments. In this example, PLP circuit 200 includes a boost converter 210, a hold-up capacitor 215, a down converter 220, a voltage monitor 230, an inverter 245, internal DC-DC converters 240, and four switches (shown as switches 202, 204, 206, and 208) whose selection determines whether PLP circuit 200 is configured for normal operation (during which the hold-up capacitor 215 is charged) or for providing hold-up energy (e.g., the energy stored in the hold-up capacitor 215) to the SSD following a power loss event. In this example embodiment, during normal operation, voltage monitor 230 monitors the input voltages provided by two host power sources (in this case, 5V and 12V power sources).

In this example embodiment, during normal operation, signal 235 (which is output from the voltage monitor 230) is asserted, indicating that the input voltages are within acceptable limits. Therefore, switches 202 and 204 (which are controlled by signal 235) are closed, connecting input voltages from the 5V and 12V sources to the internal DC-DC converters 240 (which may include a 3.3V converter, a 2.5V converter, and/or other converters) to supply power to the SSD from the main voltage rails. In addition, switch 206 is controlled by signal 235, and is closed. Closing switch 206 connects the input voltage from the 12V power supply to boost converter 210 to increase the voltage to approximately 30V and charge the hold-up capacitor 215. In this example, switch 208 is controlled by the output of invertor 245 (the inverted signal 235), and switch 208 is, therefore, open. Because switch 208 is open, the hold-up energy stored in hold-up capacitor 215 is not provided to the internal DC-DC converters 240. In this example, signal 235 is provided to PLP shutdown logic (not shown) to indicate that no shutdown actions are needed during normal operation. In some embodiments, signal 235 may also be sent to the CPU to indicate that, during normal operation, power to the SSD is being provided by the host power sources (not shown).

In the example embodiment illustrated in FIG. 2, in the case of any power loss, voltage monitor 230 may detect this condition and may de-assert signal 235 to indicate to the CPU that it should switch the power source for the SSD from the host power supplied to the backup power provided by the PLP circuit 200. In this case, because signal 235 would be de-asserted, switches 202 and 204 (which are controlled by signal 235) would be open, disconnecting PLP circuit 200 (including the internal DC-DC converters 240) from the host 5V and 12V sources. In addition, switch 206 would be open, which would disconnect the input voltage from the 12V power supply from boost converter 210. In this example, switch 208 is controlled by the output of invertor 245 (the inverted signal 235) and is, therefore, closed. Because switch 208 is closed, the internal DC-DC converters 24 would be powered from the backup power source (the hold-up energy stored in hold-up capacitor 215). In this example, signal 235 is provided to PLP shutdown logic (not shown) to indicate that shutdown actions on the SSD should begin. For example, the shutdown process may include flushing cached user data in SRAM and/or flash translation layer (FTL) data in a DRAM into NAND gates within the SSD. Ideally, hold-up capacitor 215 would provide enough energy during the hold-up time to allow the SSDs to complete their shutdown actions, thus saving any as-yet-unwritten data to the SSDs.

In some cases, including a boost converter in the PLP circuit of an SSD to increase 12V to ~30V will increase the total cost of the SSD, will require more space than would be required without the boost convertor, and/or will increase the capacitance voltage rating, which will increase the price of the hold-up capacitor while will reduce its liability. Similarly, including a down converter (sometimes referred to as a buck converter) in the PLP circuit of an SSD will increase the total cost of the SSD and will require more space than would be required without the down/buck convertor. In some cases, the hold-up capacitors required in a PLP circuit such as PLP circuit 200 illustrated in FIG. 2 (e.g., capacitors in the range of 1000 uF-1500 uF) are expensive, which will increase the total cost of the SSD. In addition, these capacitors are large, and will need more space in the device packaging, which will increase air flow resistance. In some cases, the hold-up capacitors may also need to meet strict performance requirements in terms of capacitor degradation (less than 25%) and other margins (e.g., for changes in equivalent series resistance, charge voltage variations, etc.). In one specific example, the capacitor may be required to maintain less than a 15% degradation while operating at 70° C. for 5 years to be able to support a 15 ms (maximum) shutdown process.

As illustrated in FIG. 2 and described above, solid-state storage devices (SSDs) typically include internal power loss protection (PLP) circuits to protect data before power is lost. These circuits, which typically rely on bulk capacitors, can degrade over the time. In addition, if there is bulk capacitor damage, they might not protect any data when a power loss event occurs. In some SSDs, an input voltage monitor in the PLP circuit can detect input voltage variances, such as in the event of a loss of AC power or an AC brownout for the system's power supply, after the fact (e.g., once the output voltage of power supply fallen out of regulated bandwidth by 5%).

In some embodiments of the present disclosure, an information handling system may implement a method for triggering SSD power loss protection and for providing additional hold-up during which the PLP can complete hold-up functions. As previously noted, these systems may take advantage of one or more pre-warning signals that a power supply unit (PSU) provides to the system to enable the SSDs to begin taking action to protect data before the SSDs themselves would have been able to detect an imminent power loss event. For example, in various embodiments, these signals may provide a minimum of 5 ms and as much as 25 ms pre-warning that a power loss event is (or is potentially) imminent. By providing an indication to the SSDs (or to a storage controller for the SSDs) that such a pre-warning signal has been detected, the PLP circuit in each of the SSDs may begin performance hold-up actions before the hold-up time would otherwise have begun.

In various embodiments, there may be different approaches to taking advantage of a power supply's warning signals to utilize PSU hold-up energy and improve the SSD's power loss protection performance. For example, in some embodiments, an information handling system may utilize a power supply's "input voltage good" or "VIN_GOOD" signal as pre-warning signal for an SSD's PLP circuit. In another example, an information handling system may utilize a power supply's "power okay" or "POK" signal as pre-warning signal for an SSD's PLP circuit. In yet another example, an information handling system may utilize a power supply's "energy-up okay" or "Eup_OK" signal as pre-warning signal for an SSD's PLP circuit.

In some embodiments, one of these pre-warning signals (or a signal derived from one or more of these pre-warning signals) may be routed directly from a PSU to an SSD to trigger power loss protection actions. In other embodiments, logic in the information handling system may receive one or more pre-warning signals from a PSU and, in response, may provide an interrupt signal to a storage controller to trigger power loss protection actions for one or more SSDs. In still other embodiments, logic in the information handling system may receive one or more pre-warning signals from a PSU and, in response, may initiate the execution of a storage controller command to trigger power loss protection actions for one or more SSDs. In any of these embodiments, the techniques described herein for triggering power loss protection actions for one or more SSDs based on one or more pre-warning signals provided by a PSU may be used in conjunction with a PLP circuit that includes a boost converter, and down converter, and a bulk capacitor to store hold-up energy. For example, the techniques described herein for triggering power loss protection actions for one or more SSDs based on pre-warning signals provided by a PSU may be used in conjunction with PLP circuit 200 illustrated in FIG. 2.

Figure 3:
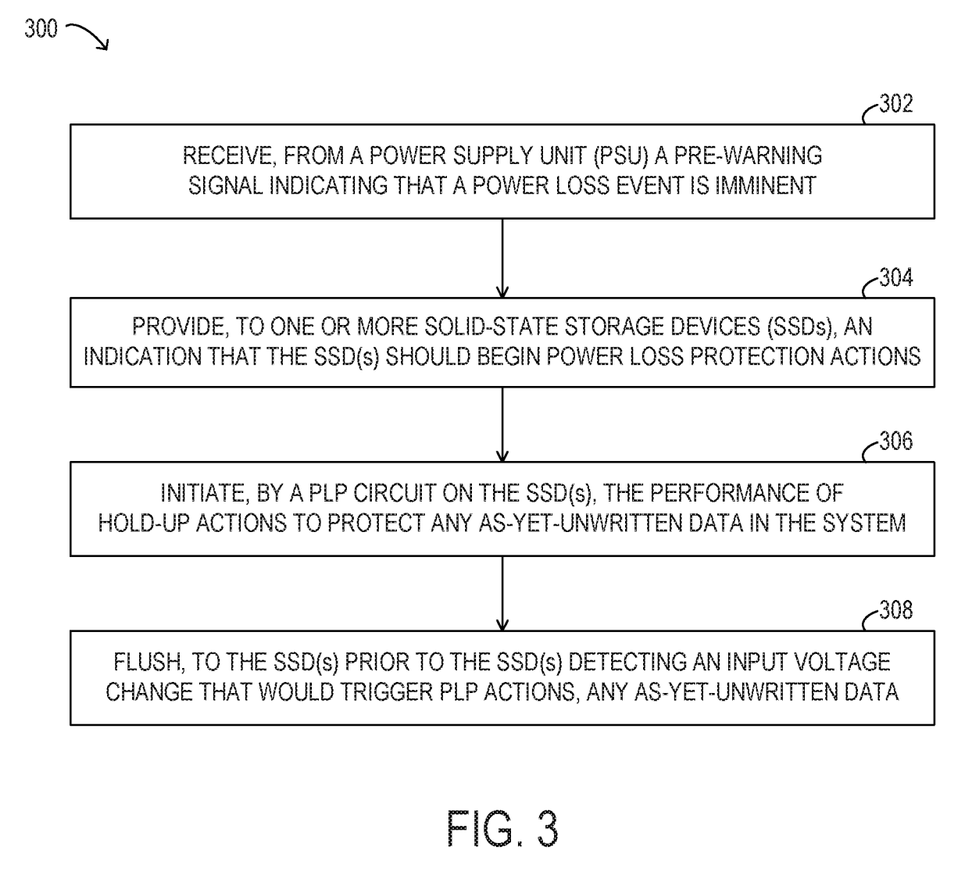
FIG. 3 is a flowchart depicting selected elements of an embodiment of a method for triggering power loss protection actions for one or more SSDs based on pre-warning signals provided by a PSU.

Referring now to FIG. 3, a block diagram of selected elements of an embodiment of a method 300 for triggering power loss protection actions for one or more SSDs based on pre-warning signals provided by a PSU, as described herein, is depicted in flowchart form. In various embodiments, method 300 may be performed by one or more instances of an information handling system 100 (see FIG. 1) and/or in conjunction with one or more instances of PLP circuit 200 (see FIG. 2). It is noted that certain operations described in method 300 may be optional or may be rearranged in different embodiments.

In FIG. 3, method 300 may begin (at 302) by receiving, from a power supply unit (PSU) in an information handling system, a pre-warning signal indicating that a power loss event is imminent (or is potentially imminent). For example, the method may include receiving a VIN_GOOD signal, a POK signal, and/or an Eup_OK signal that, when not asserted, indicates that a power loss event is imminent (or is potentially imminent). In method 300 (at 304), an indication that the solid-state storage devices (SSDs) in the information handling system should begin power loss protection actions is provided to one or more of the SSDs. Several different mechanisms for providing such an indication are described in more detail below.

In method 300 (at 306) a PLP circuit on the SSD(s) initiates the performance of one or more hold-up actions, including actions to protect any as-yet-unwritten data in the system. In method 300 (at 308) any as-yet-unwritten data is flushed to the SSD(s). This flushing may begin prior to the SSD(s) themselves detecting an input voltage change that would have triggered any power loss protection actions, absent the pre-warning indication.

In at least some embodiments of the present disclosure, the mechanisms described herein may implement an intelligent method for reserving hold-up energy specifically for SSDs to use to prevent data loss due to a power loss event. In some embodiments, one or more PSU signals (VIN_GOOD. POK, or Eup_OK) may provide an early warning of a pending shutdown of the information handling system. In some embodiments, in response to the detection of one of these signals (or various combinations of these signals), a power loss warning interrupt may be sent to the storage controller for the SSDs (e.g., a RAID controller). In various embodiments, the storage/RAID controller may notify the SSDs of the imminent power loss event via an in-band command (e.g., a STANDBY_IMMEDIATE command) or using a dedicated signal. In response to receiving the command or dedicated signal, the SSDs may perform power loss protection actions, including, for example, flushing their write queues.

In at least some embodiments, the information handling systems described herein may support programmable thresholds for triggering power loss protection actions, according to the amount of hold-up energy that is available from its power supply units. In embodiments in which pre-warning signals are available, and in which power loss protection actions can be started much earlier than in existing systems, the requirements for available hold-up energy may be significantly reduced.

In some embodiments, when the POK signal generated by the PSU is de-asserted, this may indicate that the required hold-up time following the loss of the AC input voltage of the PSU has passed. For example, in one embodiment, the PSU may be designed to provide at least 10 ms of hold-up time before the POK signal is de-asserted and the rest of the system is notified about the power loss. In one embodiment, from the time the POK signal is de-asserted, it may be another 1 to 10 ms before the 12V output of the PSU drops by 5%, to a level that is considered out of regulation. In some embodiments, by providing an indication of the POK signal to the SSD, the sum of the hold-up time (at least 10 ms) and the additional time before the 12V output of the PSU drops by 5% (between 1 and 10 ms) represents the additional time gained by the pre-warning during which the SSD can begin to perform actions to prevent data loss due to the imminent loss of power.

In some embodiments, the VIN_GOOD signal may follow the AC input voltage by an amount that is less than the required hold-up time. For example, in one embodiment, the POK signal may be de-asserted 4 ms after the VIN_GOOD is de-asserted. In this example, by providing an indication of the VIN_GOOD signal to the SSD, the minimum additional time gained by the pre-warning during which the SSD can begin to perform actions to prevent data loss due to the imminent loss of power may be 5 ms and the maximum additional time gained may be 15 ms.

In some embodiments, the PSU may generate a signal Eup_OK that is similar to the POK signal, but that provides an earlier warning that a power loss event is imminent. Like the POK signal, the Eup_OK signal is dependent on the power supply load. In one example, the POK signal may be de-asserted based on a specified timing margin of 1 ms of remaining hold-up at 100% load. If the load is less than 100%, the POK signal may provide a longer warning time. The Eup_Ok may be targeted to provide an even earlier warning for platform features and/or actions that require a longer warning time than the POK provides. In some embodiments, the Eup_OK signal may be de-asserted based on a higher bulk capacitor charge threshold than that used to trigger de-assertion of the POK signal. As with the POK signal, the amount of warning time provided by the Eup_OK signal may be dependent on the actual load. For example, if the information handling system is not 100% loaded, the time between the loss of the AC input voltage of the PSU and the de-assertion of the Eup_OK signal may be maximized, but if the system is fully loaded, then the time between the loss of the AC input voltage of the PSU and the de-assertion of the Eup_OK signal may be less.

In some embodiments, there is a large bulk capacitor within the PSU. In such embodiments, rather than directly sensing AC input voltage loss and AC input brown out conditions, the charge on the bulk capacitor may be monitored. In some such embodiments, when the charge drops below a programmable threshold (below its "full" level), it may be assumed that something has happened to the AC input voltage, because the bulk capacitor is no longer being charged properly (e.g., it is not getting the proper amount of current). In this case the "energy-up OK" signal (the Eup_OK signal) may be de-asserted. When this signal is triggered (de-asserted), it may indicate that the whole system is going to shut down, because the power supply is going to shut down. However, the use of this signal as a pre-warning signal may give the system a lot of time to take power loss protection actions. In at least some embodiments, this signal may represent a programmable threshold of the power supply that drives an interrupt out of the power supply to the system indicating a charge level in the bulk capacitor. In some embodiments, that charge level, which is based on the actual system load, may determine how much hold-up time is available to perform system hold-up functions. In one embodiment, by providing an indication of the Eup_OK signal to the SSD, the minimum additional time gained by the pre-warning during which the SSD can begin to perform actions to prevent data loss due to the imminent loss of power may be 5 ms and the maximum additional time gained may be 20 ms or more.

In some embodiments, each individual PSU may have a defined hold-up energy capability in terms of kW-ms. In some embodiments, Eup "hold-up" kW-ms values may be programmed individually. In such embodiments, VIN_GOOD may be designated as Eup_OK, such that when this signal is de-asserted, it indicates that Ert has expired, and when it is asserted, it indicates that the PSU energy reservoir is charged to capacity. In this example, Ert, which is designated for hold-up purposes, represents a kW-ms window that will allow for the loss/sag of input voltage and return without loss of functionality. Once the Eup_OK is de-asserted, and after exhausting the designated kW-ms window, the PSU may begin a shutdown sequence (irrespective of whether a valid input voltage has been re-applied). In some embodiments, a variety of factors, including but not limited to, bulk capacitor tolerance, life degradation and PSU efficiency may need to be accounted for in order to ensure that the kW-ms windows are maintained.

In some embodiments, the PSU POK signal or a timer following the assertion of one of the PSU pre-warning signals described herein, may be used to power gate the information handling system, except for the SSDs. In other words, the PSU pre-warning signals described herein may be used to reallocate the remaining PSU hold-up energy solely to the SSDs in order to prevent data loss, rather than being used for other system hold-up functions. In some such embodiments, the timing may ensure that the SSDs were notified of the imminent loss of power prior to power gating storage/RAID controller.

In some embodiments, the PSU may be able to detect AC loss and AC brownout/dropout conditions. For some systems, an AC line dropout may be defined as a drop in AC line voltage to 0~79 VAC at any phase of the AC line for any length of time. An AC line dropout within (or equal to) the specified hold-up time may not cause any tripping of control signals or protection circuits. As noted above, the hold-up time may be defined as the time delay from loss of AC to de-assertion of the POK signal. However, if the AC line dropout lasts longer than the specified maximum duration, the power supply may need to take action to recover and to meet all requirements for turning on. In one embodiment, the PSU may use Vrms to determine whether the AC input voltage is within the specified requirements for turning on the PSU. In this example, the Vrms of the input must be determined within 5 cycles after the AC input voltage has been applied and standby has reached regulation.

In one embodiment, the PSU may detect both AC brown-out and dropout conditions and may issue a power down warning to the information handling system in response. In this example, the PSU may de-assert (drive low) the VIN_GOOD signal at least 4 ms prior to the de-assertion of POK upon input conditions that fall below the Vin (turn-off) specification of the PSU. Under such conditions, after VIN_GOOD is de-asserted, the PSU may be capable of delivering all outputs within the regulation limits for at least 4 ms before de-asserting POK. In a similar manner, the PSU may de-assert the POK signal a minimum of 1 ms prior to the main rail voltage degrading to 95% of the set point voltage value. Upon the de-assertion of VIN_GOOD, the PSU may derive an average RMS input voltage, measured over a moving average window to establish whether conditions meet the requirements for the assertion of VIN_GOOD.

Figure 4:
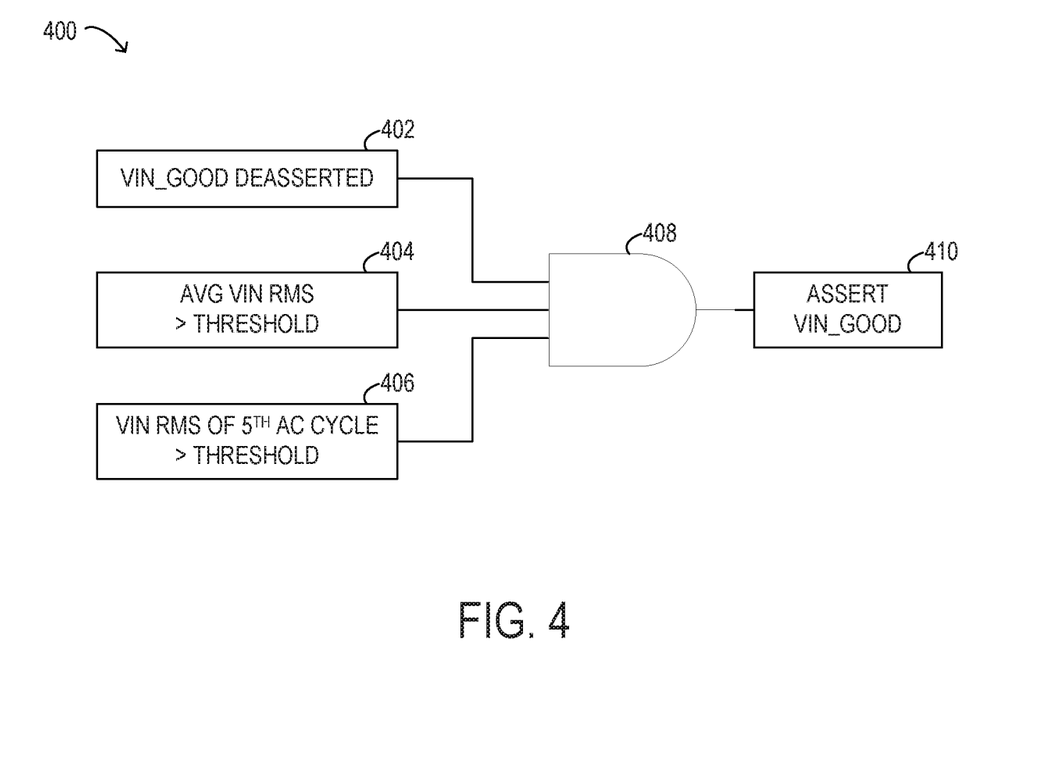
FIG. 4 is a block diagram of selected elements of an embodiment of a circuit for determining whether to assert a VIN_GOOD signal.

FIG. 4 is block diagram illustrating an example circuit for determining whether to assert the VIN_GOOD signal, according to at least some embodiments. In this example, the logic gate 408 (an AND gate) receives three inputs. The first input (402) is asserted (true) when VIN_GOOD is de-asserted. The second input (404) is asserted when the average RMS input voltage, measured over a moving average window, is greater than a predetermined threshold value. The third input (406O) is assert when the RMS input voltage of the 5th AC cycle is greater than a predetermined threshold (e.g., the same threshold used in block 404 or a different threshold). If all of these inputs are true, then the VIN_GOOD signal may be asserted (as in 410).

Figure 5:
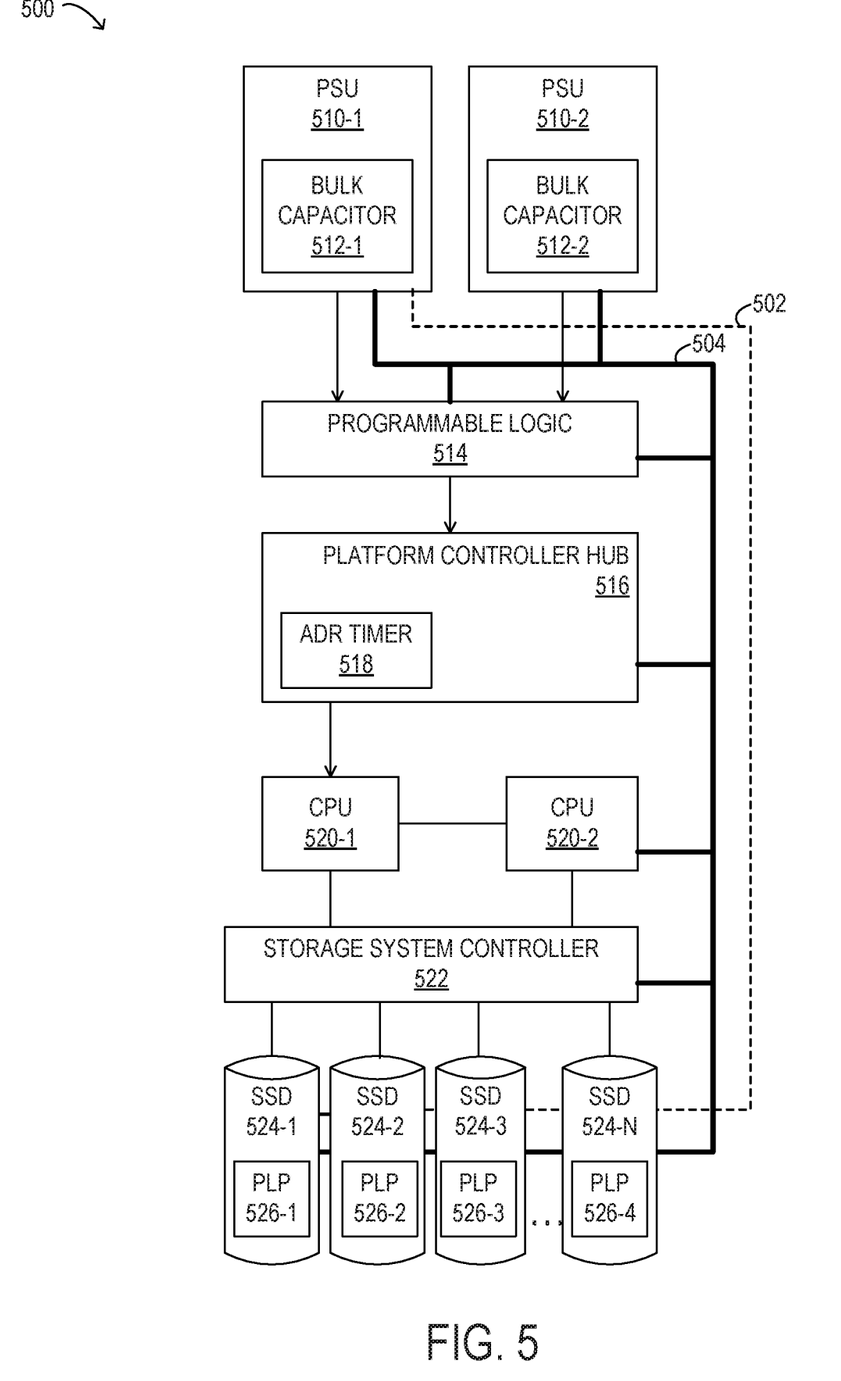
FIG. 5 is a block diagram of selected elements of an embodiment of an information handling system that implements a direct approach to triggering power loss protection on SSDs.

As noted above, in some embodiments of the present disclosure, there may be a physical connection (e.g., a wire) from the power supply to the SSD over which a pre-warning signal may be provided directly to the SSD. FIG. 5 is a block diagram illustrating selected elements of an information handling system 500 that implements a direct approach to triggering power loss protection on SSDs, according to at least some embodiments. In this example, information handling system 500 includes two power supply units (shown as PSUs 510-1 and 510-2), each of which includes a respective bulk capacitor 512, programmable logic 514, a platform controller hub 516 (which includes an ADR timer 518), two CPUs (shown as 520-1 and 520-2), a storage system controller 522 (which may be a RAID controller), and multiple SSDs (shown as SSD 524-1 to 524-N), each of which includes a respective PLP circuit 526. In some embodiments, the PLP circuits 526 may be similar to PLP circuit 200 illustrated in FIG. 2. Note that, in various embodiments, there may be any number of PSUs in information handling system 500. These PSUs may provide power to the SSDs 524 and other component of information handling system 500 as a pool of power supply resources or particular ones of the PSUs may provide power to specific SSDs 524 or other components.

In this example, the bold lines (504) connecting the PSUs to the other components of information handling system 500 represent the 12V power provided by the PSUs. The thin arrows between various components represent various signals (or collections of signals) that between those components. For example, the arrows between PSU 510-1 and programmable logic 514 and between PSU 510-2 and programmable logic 514 may represent any of a variety of signals that are output by the PSUs in existing systems to provide information about the PSUs (e.g., their type and/or state) to other components of the information handling system. In some embodiments, the arrow from platform controller hub 516 (or, more specifically, from ADR timer 518) to CPU 510-2 may represent a power management synchronization signal that triggers an ADR flush operation to main memory, rather than to any of the solid-state storage devices 526. Platform controller hub 516 may include circuitry and/or logic to perform any of a variety of support functions in information handling system 500, including controlling a display, supporting input/output operations, providing clocking, or providing other functions, in different embodiments. In some embodiments, signals connecting CPU 520-1 and CPU 520-2 may represent a standard or custom point-to-point processor interface that includes multiple channels.

In the example embodiment illustrated in FIG. 5, a dedicated drive pin is provided on each of the SSDs 524 through which a PSU pre-warning signal may be provided to the SSD. More specifically, signal 502 (shown as a dashed line that provides a direct connection from PSU 510-1 to the SSDs 524) may represent one of the PSU pre-warning signals described herein. For example, signal 502 may represent a POK signal, a VIN_GOOD signal, an Eup_OK signal, or some combination of these signals (or other signals generated by the PSU) that can be used to trigger the early initiation of power loss protection actions on the SSDs 524.

In some embodiments of the present disclosure, rather than triggering power loss protection on an SSD by providing a PSU pre-warning signal directly to the SSD, an indication of a PSU pre-warning signal may be provided to the SSD indirectly. For example, in one embodiment, an indication of the pre-warning condition may be provided through the storage/RAID controller as a command to the SSD. In this example, through that command, the SSD may execute its write commands to protect any as-yet-unwritten data before the hold-up energy is depleted.

Figure 6:
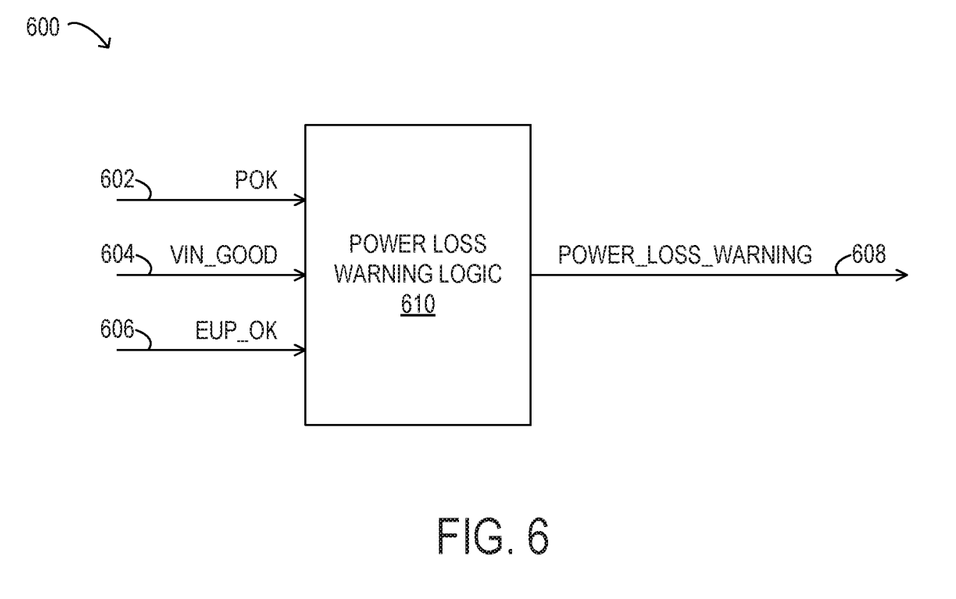
FIG. 6 is a block diagram of selected elements of an embodiment of a circuit for generating a POWER_LOSS_WARNING signal.

In some embodiments, programmable logic in the information handling system may receive one or more PSU pre-warning signals from one or more of the PSUs in the system and may generate a POWER_LOSS_WARNING signal based on those inputs. FIG. 6 is a block diagram illustrating an example circuit 600 for generating a POWER_LOSS_WARNING signal 608, according to one embodiment. In this example embodiment, the inputs to power loss warning logic 610 include one or more POK signals 602, one or more VIN_GOOD signals 604, and/or one or more EUP_OK signals 606. Power loss warning logic 610 may aggregate and/or condition these inputs in any of a variety of ways to generate POWER_LOSS_WARNING signal 608, in different embodiments. In one embodiment, power loss warning logic 610 may implement an OR function, such that if any one or more of its input is asserted (true), POWER_LOSS_WARNING signal 608 will be asserted.

Figure 7:
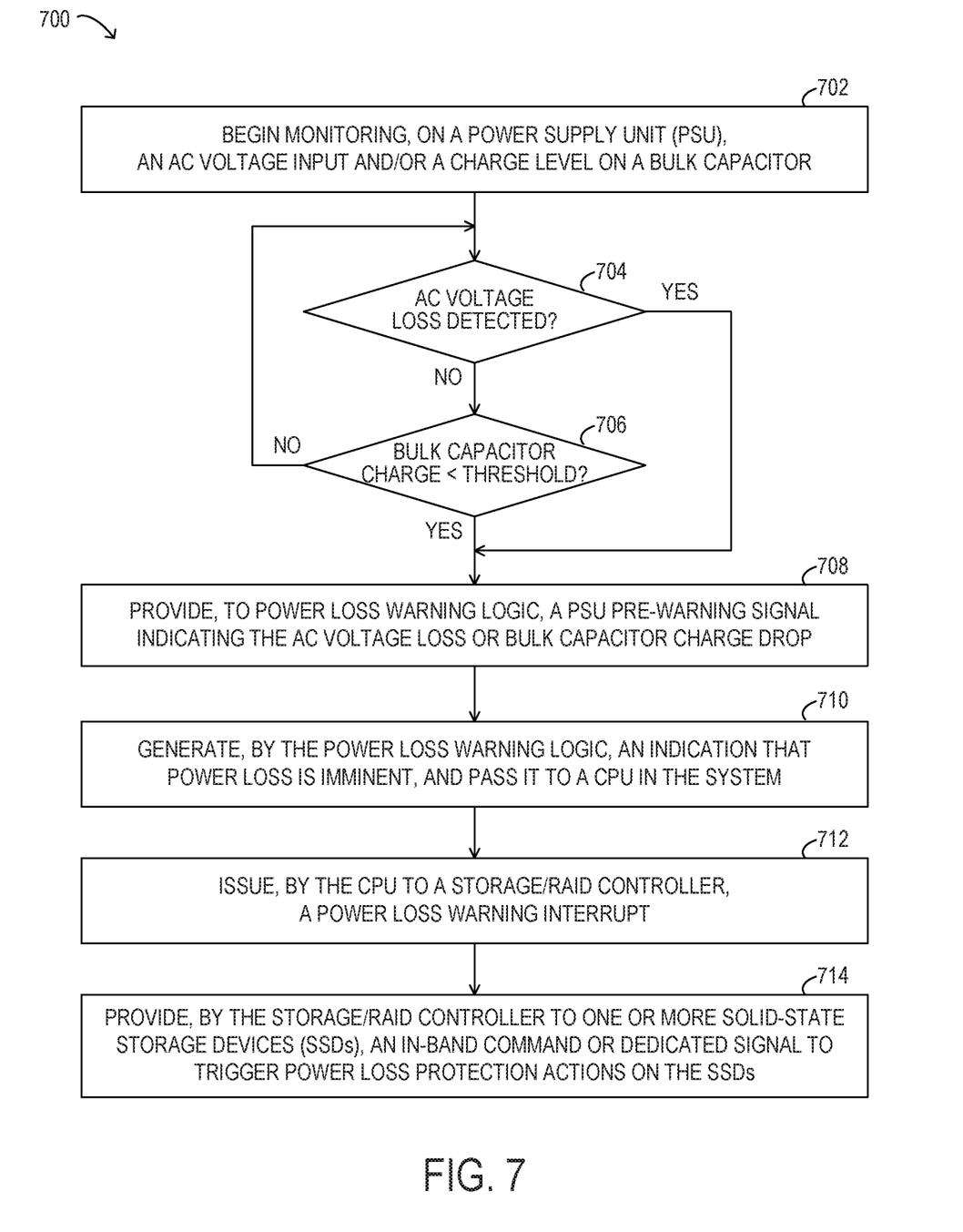
FIG. 7 is a flowchart depicting selected elements of an embodiment of a method for triggering power loss protection actions on one or more SSDs based on pre-warning signals provided indirectly by a PSU.

Referring now to FIG. 7, a block diagram of selected elements of an embodiment of a method 700 for triggering power loss protection actions for one or more SSDs based on pre-warning signals provided indirectly by a PSU, as described herein, is depicted in flowchart form. In various embodiments, method 700 may be performed by one or more instances of an information handling system 100 (see FIG. 1) and/or in conjunction with one or more instances of PLP circuit 200 (see FIG. 2). It is noted that certain operations described in method 700 may be optional or may be rearranged in different embodiments.

In FIG. 7, method 700 may begin (at 702) to monitor, on a power supply unit (PSU), an AC voltage input and/or a charge level on a bulk capacitor in the PSU. If (at 704) an AC input voltage loss is detected or if (at 706) the bulk capacitor charge drops below a predetermined threshold voltage, method 700 may proceed to 708. Otherwise, monitoring of the AC input voltage and/or bulk capacitor charge level, by the PSU, may continue until and unless one of these conditions is detected.

In method 700 (at 708), a PSU pre-warning signal indicating the AC voltage loss or bulk capacitor charge drop is provided to power loss warning logic in the information handling system. In method 700 (at 710), an indication that power loss is imminent is generated by the power loss warning logic and passed to a CPU in the information handling system. In some embodiments, the indication may be passed to the CPU through a platform controller hub. In method 700 (at 712), a power loss warning interrupt is issued by the CPU to a storage/RAID controller in the information handling system. In method 700 (at 714), an in-band message/command or dedicated signal is provided to one or more solid-state storage devices (SSDs) in the information handling system by the storage/RAID controller to trigger power loss protection actions on the SSDs. For example, in one embodiment, the storage/RAID controller may issue a "STANDBY_IMMEDIATE" type command to the SSDs. In response to receiving the in-band message/command or dedicated signal, a respective power loss protection (PLP) circuit on each of the SSDs may begin flushing its write queues. The flushing of the write queues may continue following the loss of power from the PSUs using the available hold-up energy stored in one or more capacitors in the PLP circuits of each of the SSDs.

Figure 8:
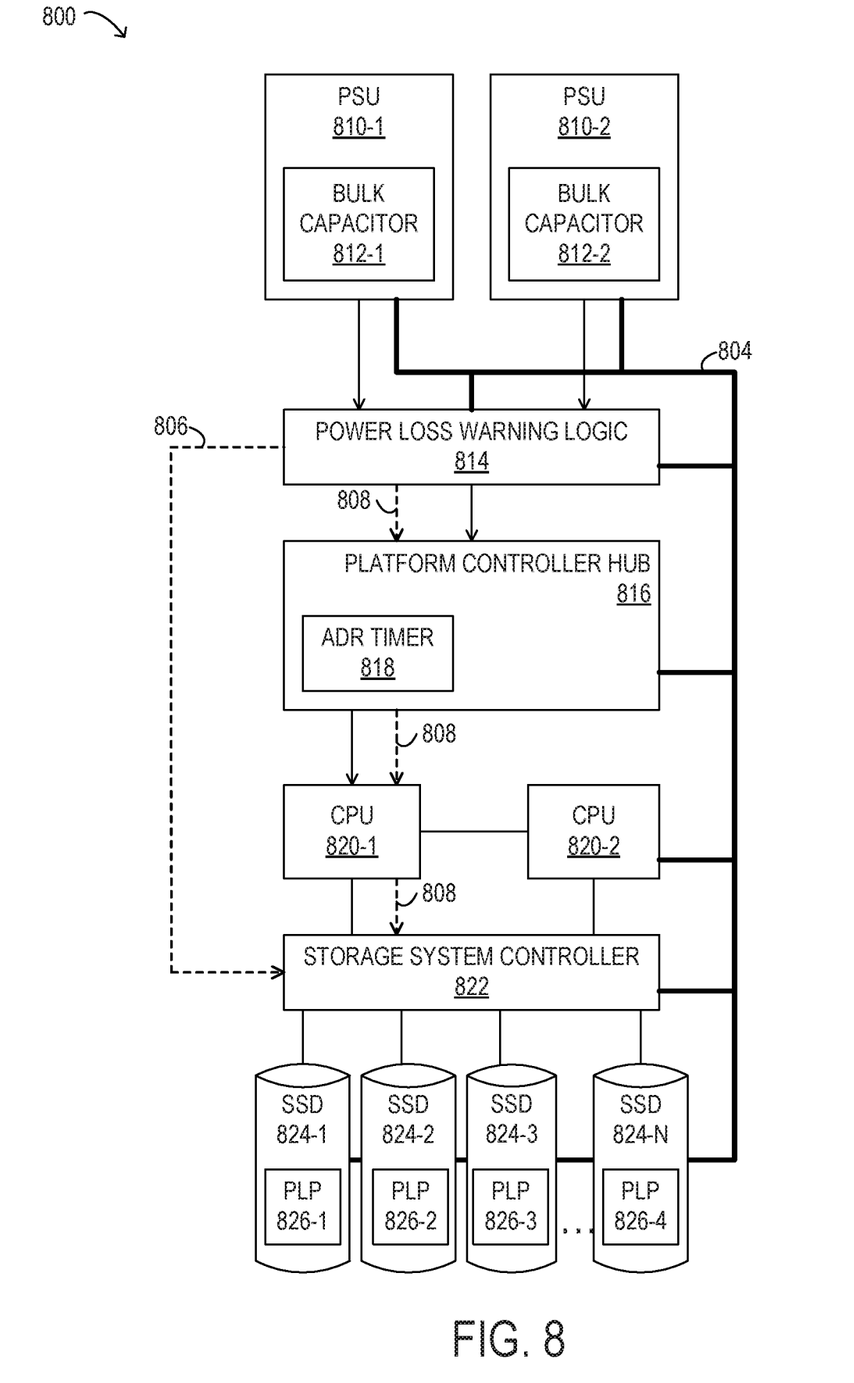
FIG. 8 is a block diagram of selected elements of an embodiment of an information handling system that implements an indirect approach to triggering power loss protection on SSDs.

FIG. 8 is a block diagram illustrating selected elements of an information handling system 800 that implements an indirect approach to triggering power loss protection on SSDs, according to at least some embodiments. In the example embodiment illustrated in FIG. 8, two options for triggering power loss protection on the SSDs 824 are depicted. In this example, information handling system 800 includes two power supply units (shown as PSUs 810-1 and 810-2), each of which includes a respective bulk capacitor 812, power loss warning logic 814, a platform controller hub 816 (which includes an ADR timer 818), two CPUs (shown as 820-1 and 820-2), a storage system controller 822 (which may be a RAID controller), and multiple SSDs (shown as SSD 824-1 to 824-N), each of which includes a respective PLP circuit 826. In some embodiments, the PLP circuits 826 may be similar to PLP circuit 200 illustrated in FIG. 2. In some embodiments, power loss warning logic 814 may be similar to power loss warning logic 610 illustrated in FIG. 6, and may generate POWER_LOSS_WARNING signal 806. As illustrated by the dashed line, in some embodiments, POWER_LOSS_WARNING signal 806 may be provided directly to storage system controller 822 from power loss warning logic 814. In some embodiments, power loss warning logic 814 may be implemented within a block of programmable logic that implements one or more other functions in addition to the generation of a POWER_LOSS_WARNING signal 806. Note that, in various embodiments, there may be any number of PSUs in information handling system 800. These PSUs may provide power to the SSDs 824 and other component of information handling system 800 as a pool of power supply resources or particular ones of the PSUs may provide power to specific SSDs 824 or other components.

In this example, the bold lines (804) connecting the PSUs to the other components of information handling system 800 represent the 12V power provided by the PSUs. The thin arrows between various components represent various signals (or collections of signals) that between those components. For example, the arrows between PSU 810-1 and programmable logic 814 and between PSU 810-2 and programmable logic 814 may represent any of a variety of signals that are output by the PSUs in existing systems to provide information about the PSUs (e.g., their type and/or state) to other components of the information handling system. In addition, these arrows may represent any of the PSU pre-warning signals described herein. In some embodiments, one of the connections from platform controller hub 816 (or, more specifically, from ADR timer 818) to CPU 810-2 may represent a power management synchronization signal that triggers an ADR flush operation to main memory, rather than to any of the solid-state storage devices 826. Platform controller hub 816 may include circuitry and/or logic to perform any of a variety of support functions in information handling system 800, including controlling a display, supporting input/output operations, providing clocking, or providing other functions, in different embodiments. In some embodiments, signals connecting CPU 820-1 and CPU 820-2 may represent a standard or custom point-to-point processor interface that includes multiple channels.

In the example embodiment illustrated in FIG. 8, a second option for indirectly triggering power loss protection on the SSDs 824 is depicted. Under this second approach, a POWER_LOSS_WARNING signal 808 generated by power loss warning logic 814 represents a pre-warning signal generated by one of the PSUs 810. In this example, signal 808 may be passed along by power loss warning logic 814 through platform controller hub 816 and CPU 820-1 to storage system controller 822 as a power loss warning interrupt. The storage controller 822 may then provide an indication of the power loss warning (in the form of an in-band message/command or a dedicated signal) to the SSDs 824 to trigger power loss protection actions in time for them to be completed before the available hold-up energy is depleted.

In various embodiments, the systems and methods described herein for triggering power loss protection on solid-state storage devices may utilize both system hold-up time and localized SSD hold-up time to protect an information handling system from data loss in the face of power loss events. In at least some embodiments, these techniques may provide PLP protection that (when compared to existing PLP solutions) provides benefits to the information handling system in one of more of the following ways:

By providing PLP functionality if an SSD's PLP circuit fails

By providing redundant PLP protection in which data is still protected even if the local PLP capacitor on an SSD degrades below the energy levels needed to to support PLP.

By reducing the cost of PLP ownership, since SSDs may not need to be replaced due to SSD capacitor degradation By reducing the voltage rating of the bulk capacitors in the PLP circuits of the SSDs, thus also reducing the cost of the bulk capacitors By reducing the size of bulk capacitors in the PLP circuits of the SSDs, thus providing more space and reducing air flow resistance in the SSDs By increasing the reliability of the PLP circuits of the SSDs and of the overall SSD through the use of lower voltage bulk capacitors in the PLP circuits By reducing the Boost/Down converter voltage rating, thus reducing the cost of these converters In embodiments in which hot-plug support is not required, the techniques described herein may be used to protect SSDs that do not include their own PLP circuits. This may allow such systems to provide power loss protection without incurring the cost of any of PLP-specific components on the SSDs.

As described above, an information handling system may, in some embodiments, implement systems and methods for triggering power loss protection on solid-state storage devices (SSDs) based on PSU pre-warning signals indicating that power loss is imminent (or is potentially imminent). In some embodiments, PSU pre-warning signals may be provided directly to the SSDs over a dedicated connection. In other embodiments, PSU pre-warning signals may be passed through one or more other components of the information handling system (such as power loss warning logic, a platform controller hub, and/or a CPU) to a storage controller for the SSDs. The power loss warning signal may be provided to the storage controller as a power loss warning interrupt. In some embodiments, this interrupt may cause the storage system controller to issue an in-band message/command to the SSDs to trigger power loss protection actions on the SSDs. In other embodiments, the interrupt may cause the storage system to provide a signal on a dedicated connection to the SSDs to trigger power loss protection actions on the SSDs.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for triggering power loss protection on solid-state storage devices in an information handling system, comprising:
   detecting, by a power supply unit, a condition indicative of an imminent power loss event;
   outputting, at a dedicated drive pin of the power supply unit communicatively coupled directly to one or more solid-state storage devices by the power supply unit responsive to detection of the condition, a pre-warning signal indicating that a power loss event is imminent and that a predetermined minimum hold-up time following a loss or reduction of AC input voltage has expired; and
   initiating, by a respective power loss protection circuit on each of the one or more solid-state devices in response to receiving the pre-warning signal from the power supply unit, performance of one or more actions to prevent data loss in the information handling system, wherein the initiating is performed prior to the power loss event being detectable by the respective power loss protection circuit.

2. The method of claim 1, wherein:
   the one or more actions to prevent data loss include:
   switching a power source for at least one of the one or more solid-state storage devices from the power supply unit to hold-up energy stored in the respective power loss protection circuit of the at least one of the one or more solid-state storage devices; and
   the method further comprises:
   performing the one or more actions to prevent data loss prior to depletion of the hold-up energy.

3. The method of claim 1, wherein:
   the one or more actions to prevent data loss include:
   flushing one or more write queues to persistent memory on the one or more solid-state storage devices.

4. The method of claim 1, wherein:
   detecting a condition indicative of an imminent power loss event comprises:
   monitoring AC input voltage; and
   detecting a loss of AC input voltage; and the pre-warning signal indicates that an AC input voltage level does not meet a predetermined minimum voltage level.

5. The method of claim 1, wherein:
detecting a condition indicative of an imminent power loss event comprises:
monitoring a charge on a bulk capacitor of a power supply unit; and
detecting that the charge on the bulk capacitor has dropped below a predetermined threshold value; and
the pre-warning signal indicates that the charge on the bulk capacitor has dropped below the predetermined threshold value.

6. An information handling system, comprising:
one or more solid-state storage devices; and
a power supply unit comprising circuitry to:
detect a condition indicative of an imminent power loss event; and
output, at a dedicated drive pin of the power supply unit communicatively coupled directly to the one or more solid-state storage devices responsive to detection of the condition, a pre-warning signal to indicate that a power loss event is imminent and that a predetermined minimum hold-up time following a loss or reduction of AC input voltage has expired;
wherein each of the one or more solid-state storage devices comprises:
a power loss protection circuit to:
initiate, responsive to receipt of the pre-warning signal from the power supply unit, performance of one or more actions to prevent data loss in the information handling system prior to detection of the power loss event by the power loss protection circuit.

7. The information handling system of claim 6, wherein:
the one or more actions to prevent data loss include:
an action to switch a power source for the one or more solid-state storage devices from the power supply unit to hold-up energy stored in the respective power loss protection circuit of the one or more solid-state storage devices; and
the one or more actions to prevent data loss are performed prior to depletion of the hold-up energy.

8. The information handling system of claim 6, wherein:
the one or more actions to prevent data loss include:
an action to flush one or more write queues to persistent memory on the one or more solid-state storage devices.

9. The information handling system of claim 6, wherein to detect the condition indicative of an imminent power loss event, the power supply unit further comprises circuitry to:
monitor AC input voltage; and
detect a loss of AC input voltage.

10. The information handling system of claim 9, wherein the pre-warning signal indicates that an AC input voltage level does not meet a predetermined minimum voltage level.

11. The information handling system of claim 6, wherein to detect the condition indicative of an imminent power loss event, the power supply unit further comprises circuitry to:
monitor a charge on a bulk capacitor of a power supply unit; and
detect that the charge on the bulk capacitor has dropped below a predetermined threshold value.

12. The information handling system of claim 11, wherein the pre-warning signal indicates that the charge on the bulk capacitor has dropped below the predetermined threshold value.

13. A system, comprising:
a storage controller;
a storage device coupled to the storage controller; and
a power supply unit comprising circuitry to:
detect a condition indicative of an imminent power loss event; and
output, at a dedicated drive pin of the power supply unit communicatively coupled directly to the storage device responsive to detection of the condition, a pre-warning signal to indicate that a power loss event is imminent and that a predetermined minimum hold-up time following a loss or reduction of AC input voltage has expired;
wherein the storage device comprises:
a power loss protection circuit to:
initiate, responsive to receipt of the pre-warning signal from the power supply unit, performance of one or more actions to prevent data loss in the system prior to detection of the power loss event by the storage controller.

14. The system of claim 13, wherein the one or more actions include one or more of:
an action to switch a power source for the storage device from the power supply unit to hold-up energy stored in the power loss protection circuit of the storage device; and
an action to flush one or more write queues to persistent memory on the storage device prior to depletion of hold-up energy stored in the power loss protection circuit of the storage device.

15. The system of claim 13, wherein:
to detect the condition indicative of an imminent power loss event, the power supply unit further comprises circuitry to:
monitor AC input voltage; and
detect a loss of AC input voltage; and
the pre-warning signal indicates that an AC input voltage level does not meet a predetermined minimum voltage level.

16. The system of claim 13, wherein:
to detect the condition indicative of an imminent power loss event, the power supply unit further comprises circuitry to:
monitor a charge on a bulk capacitor of a power supply unit; and
detect that the charge on the bulk capacitor has dropped below a predetermined threshold value; and
the pre-warning signal indicates that the charge on the bulk capacitor has dropped below the predetermined threshold value.

* * * * *